F. T. BYERS.
STORAGE CARRIER FOR PORTABLE ELEVATORS.
APPLICATION FILED MAR. 26, 1909.

946,008.

Patented Jan. 11, 1910.

Witnesses
H. J. Strickel
Charles N. Murray

Inventor
Frank T. Byers
by
Eugene C. Brown
Attorney

UNITED STATES PATENT OFFICE.

FRANK T. BYERS, OF MOUNT PLEASANT, PENNSYLVANIA.

STORAGE-CARRIER FOR PORTABLE ELEVATORS.

946,008.  Specification of Letters Patent.  Patented Jan. 11, 1910.

Application filed March 26, 1909. Serial No. 485,938.

*To all whom it may concern:*

Be it known that I, FRANK T. BYERS, a citizen of the United States, residing at Mount Pleasant, in the county of Westmoreland and State of Pennsylvania, have invented certain new and useful Improvements in Storage-Carriers for Portable Elevators, of which the following is a specification.

My invention relates to storage-carriers for portable elevators and is designed to serve as a temporary storage for the materials delivered by the endless-conveyer elevators which are adapted to operate continuously.

The object of my invention is to provide a receptacle adapted to be pivotally attached to the delivery-end of a portable elevator, and so arranged that it may be readily brought into position to receive the materials delivered by the endless belt or conveyer or may be folded back under the elevator body when desired. This will be found especially useful in connection with the elevators carried by harvesting machinery such as headers employed in gathering grain, although it may also be found useful in connection with other kinds of portable elevators.

In the operation of grain headers it is customary to have a separate vehicle known as the header-box travel alongside of the header to receive the grain as it is continuously delivered by the conveyer of the header elevator. When a header-box has been filled it is taken away to a place of storage to be emptied and returned or else another header-box is driven up to take its place as the header proceeds. This necessitates stopping the header and a greater or less delay while the change is being made and consumes time which is exceedingly valuable during the harvesting of grain which is ripe and when delay in gathering may be disastrous to the crop.

The advantages to be derived from the use of my invention will now be appreciated. When a header-box has been filled, my storage-carrier is drawn into operative position to receive the grain and the header may continue to move through the field cutting the grain, the carrier serving as a storage for the grain delivered by the elevator until a header-box has again driven alongside the header.

In order that my invention may be clearly understood, reference is made to the accompanying drawings, in which—

Figure 1:
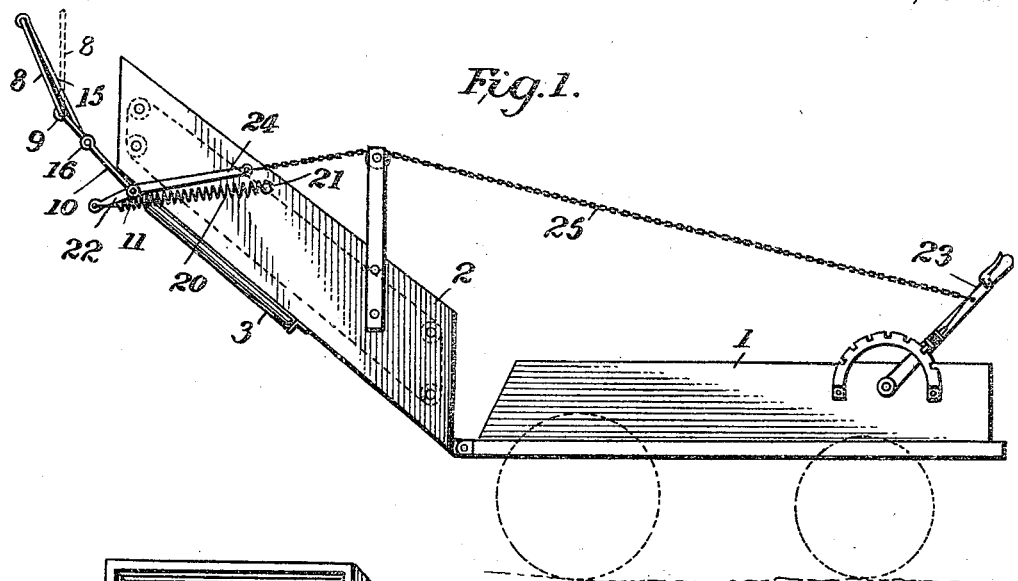
Figure 2:
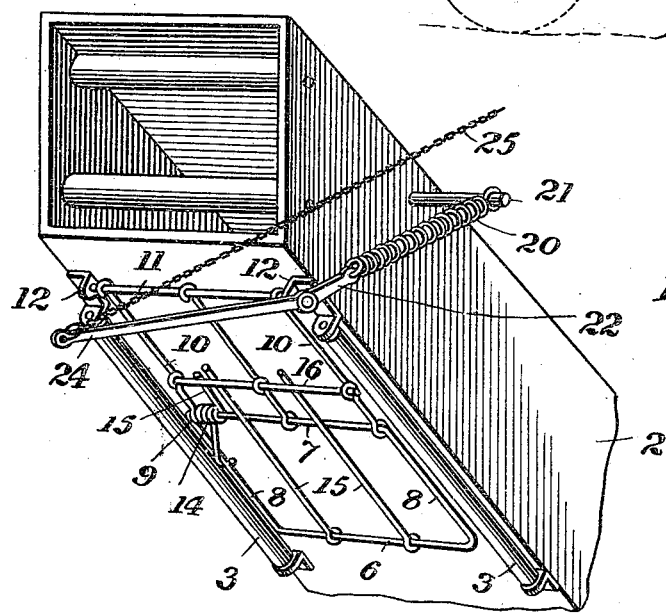
Figure 3:
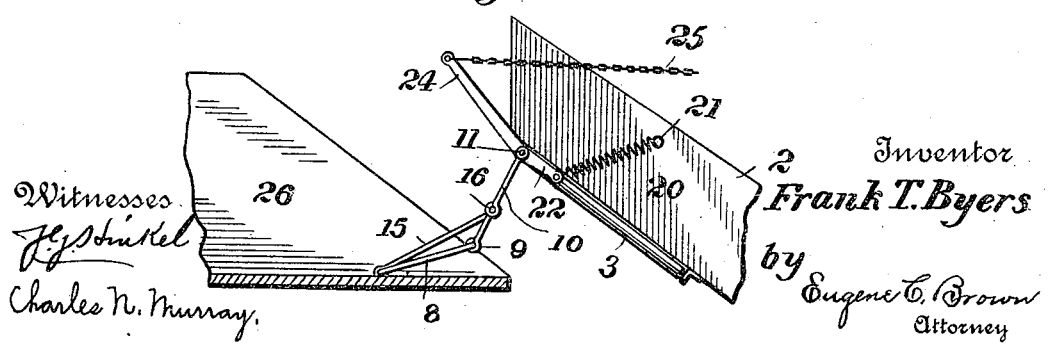

Figure 1 is a diagrammatic illustration in side elevation of a portable elevator showing my storage-carrier attached thereto; Fig. 2 is a perspective view of the delivery end of the elevator showing the storage-carrier swung underneath the body in inoperative position; Fig. 3 is a side elevation showing the manner in which the carrier is adapted to automatically fold when meeting with an obstruction, as when it strikes the side of the header-box.

In the accompanying drawings, 1 designates a vehicle, which may be a grain header, to which is attached a portable elevator 2 provided with the usual endless belt or conveyer adapted to be continuously operated in any suitable manner, as by connection with the running gear of the vehicle. Upon the underside of the elevator body, near its outer end are rollers 3, adapted to engage with the header-box or other receptacle which receives the materials delivered by the conveyer.

I have shown the storage carrier as an open wire framework, although it is evident that other constructions would serve the same purpose. The carrier frame comprises the outer portion having the transverse bars 6, 7, and the longitudinal bars 8, forming a rectangular frame pivotally secured at 9 to the rear portion which also consists of a rectangular frame having the longitudinal side bars 10 and the transverse bars 11 pivotally mounted in the lugs 12 attached to the elevator body. A spring 14 maintains the two portions of the carrier frame in extended position with the brace bars 15 attached to the forward portion bearing against the stop-bar 16, attached to the rear portion. The carrier is normally held in inoperative position under the elevator body, in the position shown in Fig. 2, by means of a retractile spring 20, secured to a pin 21 on the elevator body, and attached to the arm 22 of a bell-crank lever secured to the pivotal bar 11 of the carrier frame. In this position it will be observed that the carrier frame is protected upon either side by the roller guards 3 attached to the elevator body.

When it is desired to raise the storage carrier into operative position to receive the grain or other material delivered by the elevator conveyer, the frame is swung from the position shown in Fig. 2 to the position shown in Fig. 1 by means of the shifting lever 23, connected to the arm 24 of the bell-crank lever by means of a chain or rope 25, the shifting lever being located near the seat of the driver or operator on the header or other vehicle to which it is connected.

In case the carrier frame should strike a header-box 26, or other obstruction, the outer portion will yield and fold back in the manner shown in Fig. 3. In this manner, the carrier frame may be swung to the inoperative position after the header-box or receptacle has been placed alongside of the elevator, and permits the grain or other material which has been temporarily stored therein to be discharged as the carrier frame is lowered from its operative position. It will be observed that the carrier frame is automatically swung to the inoperative position under the elevator body by means of the spring 20, as soon as the tension has been released upon the chain 25.

The advantages of my invention, when used in connection with portable elevators which are adapted to operate continuously, will now be appreciated. When this is used as a storage carrier for the elevator of a grain header, it enables the harvesting of the grain to proceed uninterruptedly when the header boxes are periodically changed. Furthermore, it is frequently desirable to cut the grain for a certain distance in entering a new field before bringing the header box alongside, in order to avoid the trampling of the uncut grain. After extending the cut over a certain area, in order to prepare a path for the header-box, the latter may then be brought into operation without the loss of any of the grain. Many other uses will occur to those familiar with the operation of portable conveyer elevators.

It is also obvious that many changes may be made in the construction of my storage carrier without departing from the spirit of my invention.

Having thus described my invention and the manner in which the same may be used, I claim—

1. In a storage carrier for portable elevators of the class set forth, in combination, a portable elevator, a frame pivotally secured thereon, means for holding the frame in operative position in front of the elevator, guards secured to the underside of the elevator, and means for automatically moving the frame into inoperative position between said guards upon the release of said holding means.

2. A storage carrier for portable elevators, comprising a carrier frame, means carried by the elevator for pivotally mounting said frame upon the elevator body, resilient means for normally retracting the frame and holding it in close proximity to the underside of the elevator, and means for raising the frame into operative position in front of the delivery end of the elevator.

3. A storage carrier for portable elevators, comprising a carrier frame composed of sections and pivotally connected, means carried by one of said sections for yieldingly holding the sections extended, means carried by the body of the elevator for pivotally securing the said frame thereon, resilient means for normally retracting the frame into inoperative position, and means for swinging the said frame into operative position in front of the delivery end of the elevator.

4. A storage carrier for portable elevators, comprising in combination with the elevator, a frame having pivotally connected sections, yielding means carried by one of the said sections for normally holding the sections in extended position while permitting the outer section to yield upwardly with respect to the inner section, and means carried by the said section for bracing the sections against one another when in extended position.

5. In a storage carrier for portable elevators, in combination, a portable elevator, a sectional carrier pivotally secured to the underside of the body of the said elevator near the delivery end thereof, a bell-crank lever mounted upon one of the sections of the carrier for operating the said frame, a rope or chain connected to one arm of the said bell-crank lever for swinging the frame into operative position in front of the delivery end of the carrier, resilient means connected with the other end of the said bell-crank lever for retracting the said frame into inoperative position, means comprising a spring secured to one of said sections for yieldingly holding the sections of the said frame in extended position, and means comprising bars carried by the said section for bracing the sections when extended.

In testimony whereof I affix my signature, in presence of two witnesses.

FRANK T. BYERS.

Witnesses:
 NETTE L. BYERS,
 R. A. BYERS.